United States Patent
Cooper et al.

(10) Patent No.: US 11,095,017 B2
(45) Date of Patent: Aug. 17, 2021

(54) ELECTRONIC DEVICE HAVING ANGLE OF ARRIVAL DETECTION CAPABILITIES

(71) Applicant: Apple Inc., Cupertino, CA (US)

(72) Inventors: Aaron J. Cooper, San Jose, CA (US); Amin Tayebi, San Jose, CA (US); Carlo Di Nallo, Belmont, CA (US); Zheyu Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 16/035,325

(22) Filed: Jul. 13, 2018

(65) Prior Publication Data

US 2020/0021011 A1 Jan. 16, 2020

(51) Int. Cl.

| H01Q 1/24 | (2006.01) |
|---|---|
| H01Q 5/25 | (2015.01) |
| H01Q 21/06 | (2006.01) |
| H01Q 9/04 | (2006.01) |
| H01Q 1/52 | (2006.01) |
| G01S 3/48 | (2006.01) |

(Continued)

(52) U.S. Cl.
CPC ............. *H01Q 1/243* (2013.01); *G01S 3/043* (2013.01); *G01S 3/48* (2013.01); *H01Q 1/523* (2013.01); *H01Q 3/2605* (2013.01); *H01Q 5/25* (2015.01); *H01Q 9/0407* (2013.01); *H01Q 21/065* (2013.01)

(58) Field of Classification Search
CPC ...... H01Q 1/243; H01Q 1/523; H01Q 3/2605; H01Q 9/0407; H01Q 9/0421; H01Q 5/25; H01Q 21/065; G01S 3/48; G01S 3/043
See application file for complete search history.

(56) References Cited

U.S. PATENT DOCUMENTS

| 6,285,327 B1 | 9/2001 | See |
| 7,880,684 B2 | 2/2011 | Schantz |
| 9,530,726 B2 | 12/2016 | Moon et al. |

(Continued)

FOREIGN PATENT DOCUMENTS

| CN | 101741418 A | 6/2010 |
| CN | 102013554 A | 4/2011 |

(Continued)

*Primary Examiner* — Robert Karacsony
(74) *Attorney, Agent, or Firm* — Treyz Law Group, P.C.; Michael H. Lyons; Tianyi He

(57) ABSTRACT

An electronic device may be provided with wireless circuitry that includes first, second, and third antennas used to determine the position and orientation of the electronic device relative to external equipment. The antennas may include patch elements on respective substrates mounted to a flexible printed circuit. Each substrate may include fences of conductive vias that are coupled to ground and that laterally surround the corresponding patch element. Control circuitry may identify phase differences between the first and second antennas and between the second and third antennas and may identify an angle of arrival of received ultra-wideband signals using the phase differences. The control circuitry may compare the phase differences to a set of predetermined surfaces of phase differences to identify environmental loading conditions for the antenna. The control circuitry may correct the angle of arrival using offsets identified based on the environmental loading conditions.

20 Claims, 11 Drawing Sheets

(51) Int. Cl.
*G01S 3/04* (2006.01)
*H01Q 3/26* (2006.01)

(56) References Cited

U.S. PATENT DOCUMENTS

| | | | |
|---|---|---|---|
| 9,536,421 | B2 | 1/2017 | Singhar et al. |
| 9,843,111 | B2 | 12/2017 | Ying et al. |
| 2005/0262794 | A1 | 12/2005 | Derache |
| 2006/0002375 | A1 | 1/2006 | Kobashi et al. |
| 2012/0257508 | A1 | 10/2012 | Reunamäki et al. |
| 2018/0006359 | A1* | 1/2018 | Wong .................. H01Q 21/065 |
| 2019/0097317 | A1* | 3/2019 | Di Nallo .................. G01S 5/12 |

FOREIGN PATENT DOCUMENTS

| | | |
|---|---|---|
| CN | 103180751 A | 6/2013 |
| CN | 103283088 A | 9/2013 |
| CN | 103367864 A | 10/2013 |
| CN | 105929377 A | 9/2016 |
| CN | 107565213 A | 1/2018 |
| KR | 101406349 B1 | 6/2014 |

* cited by examiner

ELECTRONIC DEVICE HAVING ANGLE OF ARRIVAL DETECTION CAPABILITIES

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected.

Some electronic devices perform location detection operations to detect the location of an external device based on an angle of arrival of signals received from the external device (using multiple antennas). If care is not taken, external objects can block or load one or more of the antennas and can make it difficult to accurately estimate the angle of arrival.

It would therefore be desirable to be able to provide wireless circuitry for electronic devices having improved angle of arrival detection capabilities.

SUMMARY

An electronic device may be provided with wireless circuitry and control circuitry. The wireless circuitry may include multiple antennas and transceiver circuitry. The wireless circuitry may include antenna structures used to determine the position and orientation of the electronic device relative to external wireless equipment. The antenna structures may determine the position and orientation of the electronic device relative to external wireless equipment at least in part by measuring the angle of arrival of radio-frequency signals from the external wireless equipment.

An antenna module may include a flexible printed circuit and first, second, and third substrates mounted to the flexible printed circuit. A first patch antenna may include a first antenna resonating element on the first substrate. A second patch antenna may include a second antenna resonating element on the second substrate. A third patch antenna may include a third antenna resonating element on the third substrate. Ground traces may be formed in the first, second, and third substrates. Fences of conductive vias may extend through the first, second, and third substrates and may laterally surround the corresponding antenna resonating elements.

The electronic device may include a dielectric cover layer and a conductive layer coupled to the dielectric cover layer. The antenna module may be mounted within the electronic device so that the first, second, and third antennas are aligned with one or more apertures in the conductive layer. The dielectric cover layer may form a rear housing wall for the electronic device.

The first, second, and third antennas may receive radio-frequency signals such as ultra-wideband signals from external wireless equipment. Control circuitry in the electronic device may measure a first phase difference between the first and second antennas and may measure a second phase difference between the second and third antennas from the received ultra-wideband signals. The control circuitry may generate an angle of arrival value for the received ultra-wideband signals based on the first and second phase differences. The control circuitry may compare the first and second phase differences to a set of predetermined environment-specific curves or surfaces of phase difference values. The control circuitry may identify predetermined curves or surfaces in the set that match the first and second phase differences. The control circuitry may determine an environmental loading condition for the antennas based on the identified curves or surfaces. The control circuitry may identify predetermined offset values corresponding to the determined environmental loading condition. The control circuitry may generate a corrected angle of arrival value by adjusting the angle of arrival value using the identified offset values.

The corrected angle of arrival may accurately reflect the location of the wireless communications equipment relative to the electronic device. In this way, the control circuitry may accurately determine the location of the wireless communications equipment regardless of whether the antennas are being loaded by external objects.

DETAILED DESCRIPTION

Figure 1:
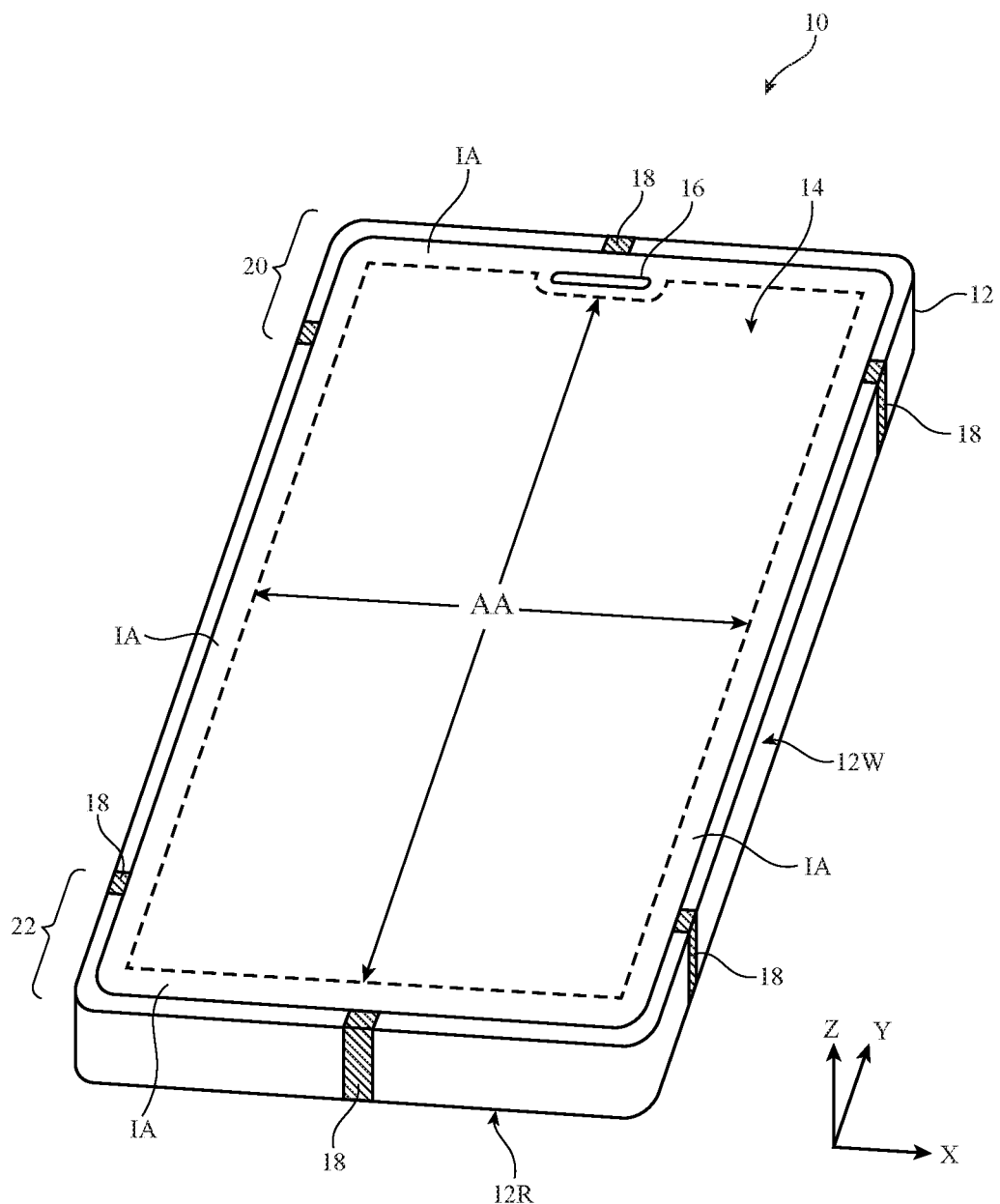
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands. Communications bands handled by the wireless communications circuitry can include satellite navigation system communications bands, cellular telephone communications bands, wireless local area network communications bands, near-field communications bands, ultra-wideband communications bands, or other wireless communications bands.

The wireless communications circuitry may include one or more antennas. The antennas can include patch antennas, loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide peripheral conductive structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layers in display 14 that overlaps inactive area IA may be coated with an opaque masking layer in inactive area IA. The opaque masking layer may have any suitable color.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of peripheral conductive structures 12W). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20.

In general, device 10 may include any suitable number of antennas (e.g., one or more, two or more, three or more, four or more, etc.). The antennas in device 10 may be located at opposing first and second ends of an elongated device housing (e.g., ends at regions 22 and 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. There may be, for example, two peripheral conductive segments in peripheral conductive housing structures 12W (e.g., in an arrangement with two of gaps 18), three peripheral conductive segments (e.g., in an arrangement with three of gaps 18), four peripheral conductive segments (e.g., in an arrangement with four of gaps 18), six peripheral conductive segments (e.g., in an arrangement with six gaps 18), etc. The segments of peripheral conductive housing structures 12W that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 12W and may form antenna slots, gaps 18, and other structures in device 10. Polymer or other dielectric may fill these grooves and other housing openings. In some situations, housing openings that form antenna slots and other structure may be filled with a dielectric such as air.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas (as an example). An upper antenna may, for example, be formed at the upper end of device 10 in region 20. A lower antenna may, for example, be formed at the lower end of device 10 in region 22. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, ultra-wideband communications, etc.

Figure 2:
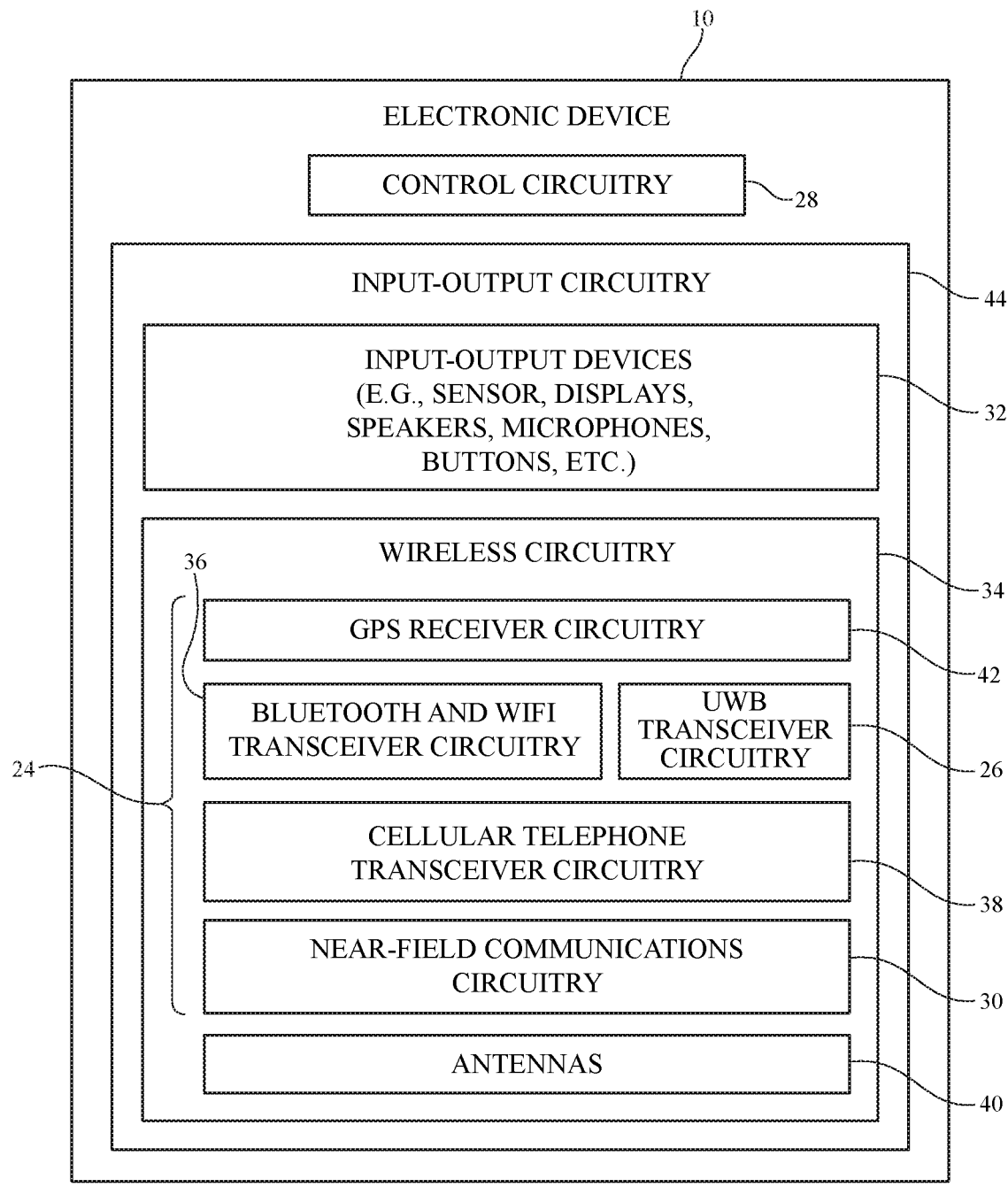
FIG. 2 is a schematic diagram of illustrative circuitry in an electronic device in accordance with an embodiment.

A schematic diagram showing illustrative components that may be used in device 10 is shown in FIG. 2. As shown in FIG. 2, device 10 may include storage and processing circuitry such as control circuitry 28. Control circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 28 may be used to control the operation of device 10. This processing circuitry may be based on one or more microprocessors, microcontrollers, digital signal processors, application specific integrated circuits, etc.

Control circuitry 28 may be used to run software on device 10, such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as WiFi®), protocols for other short-range wireless communications links such as the Bluetooth® protocol or other wireless personal area network (WPAN) protocols, cellular telephone protocols, MIMO protocols, antenna diversity protocols, satellite navigation system protocols, millimeter wave communications protocols, IEEE 802.15.4 ultra-wideband communications protocols or other ultra-wideband communications protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 44 may include wireless circuitry 34 (sometimes referred to herein as wireless communications circuitry 34). To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

Wireless circuitry 34 may include radio-frequency transceiver circuitry 24 for handling various radio-frequency communications bands. For example, wireless circuitry 34 may include transceiver circuitry 42, 36, 38, 26, and 30. Transceiver circuitry 36 may be wireless local area network transceiver circuitry. Transceiver circuitry 36 may handle 2.4 GHz and 5 GHz bands for WiFi® (IEEE 802.11) communications or other WLAN bands and may handle the 2.4 GHz Bluetooth® communications band or other WPAN bands. Transceiver circuitry 36 may sometimes be referred to herein as WLAN transceiver circuitry 36.

Wireless circuitry 34 may use cellular telephone transceiver circuitry 38 (sometimes referred to herein as cellular transceiver circuitry 38) for handling wireless communications in frequency ranges (communications bands) such as a low band (sometimes referred to herein as a cellular low band LB) from 600 to 960 MHz, a midband (sometimes referred to herein as a cellular midband MB) from 1400 MHz or 1700 MHz to 2170 or 2200 MHz, and a high band (sometimes referred to herein as a cellular high band HB) from 2200 or 2300 to 2700 MHz (e.g., a high band with a peak at 2400 MHz) or other communications bands between 600 MHz and 4000 MHz or other suitable frequencies (as examples). Cellular transceiver circuitry 38 may handle voice data and non-voice data.

Wireless circuitry 34 may include satellite navigation system circuitry such as Global Positioning System (GPS) receiver circuitry 42 for receiving GPS signals at 1575 MHz or for handling other satellite positioning data (e.g., GLO-NASS signals at 1609 MHz). Satellite navigation system signals for receiver 42 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 30 (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet.

Ultra-wideband (UWB) transceiver circuitry 26 may support communications using the IEEE 802.15.4 protocol and/or other wireless communications protocols (e.g., ultra-wideband communications protocols). Ultra-wideband wireless signals may be based on an impulse radio signaling scheme that uses band-limited data pulses. Ultra-wideband signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). Transceiver circuitry 26 may operate (i.e., convey radio-frequency signals) in frequency bands such as an ultra-wideband frequency band between about 5 GHz and about 8.3 GHz (e.g., a 6.5 GHz frequency band, an 8 GHz frequency band, and/or at other suitable frequencies).

Wireless circuitry 34 may include antennas 40. Antennas 40 may be formed using any suitable antenna types. For example, antennas 40 may include antennas with resonating elements that are formed from patch antenna structures, slot antenna structures, loop antenna structures, antenna structures having parasitic elements, inverted-F antenna structures, planar inverted-F antenna structures, helical antenna structures, monopole antennas, dipole antenna structures, Yagi (Yagi-Uda) antenna structures, hybrids of these designs, etc. If desired, one or more of antennas 40 may be cavity-backed antennas.

Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include two or more antennas for handling ultra-wideband wireless communication. In one suitable arrangement that is described herein as an example, antennas 40 include three antennas for handling ultra-wideband wireless communication.

Transmission line paths may be used to route antenna signals within device 10. For example, transmission line paths may be used to couple antennas 40 to transceiver circuitry 24. Transmission lines in device 10 may include coaxial probes realized by metalized vias, microstrip transmission lines, stripline transmission lines, edge-coupled microstrip transmission lines, edge-coupled stripline transmission lines, waveguide structures, transmission lines formed from combinations of transmission lines of these types, etc.

Transmission lines in device 10 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Figure 3:
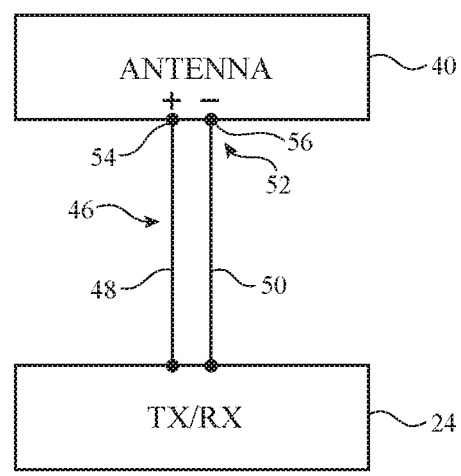
FIG. 3 is a diagram of illustrative wireless circuitry in accordance with an embodiment.

A schematic diagram of an antenna 40 coupled to transceiver circuitry 24 (e.g., ultra-wideband transceiver 26) is shown in FIG. 3. As shown in FIG. 3, transceiver circuitry 24 may be coupled to antenna feed 52 of antenna 40 using transmission line structures such as radio-frequency transmission line 46.

Antenna feed 52 may include a positive antenna feed terminal such as positive antenna feed terminal 54 and may include a ground antenna feed terminal such as ground antenna feed terminal 56. Transmission line 46 may be formed from metal traces on a printed circuit or other conductive structures and may have a positive transmission line signal path such as path 48 (sometimes referred to herein as signal conductor 48) that is coupled to positive antenna feed terminal 54. Transmission line 46 may have a ground transmission line signal path such as path 50 (sometimes referred to herein as ground conductor 50) that is coupled to ground antenna feed terminal 56. Filter circuitry, switching circuitry, impedance matching circuitry, tunable components, and other circuitry may be interposed within transmission line 46 and/or may be incorporated into antenna 40 if desired (e.g., to support antenna tuning, to support operation in desired frequency bands, etc.).

During operation, device 10 may communicate with external wireless equipment. If desired, device 10 may use radio-frequency signals conveyed between device 10 and the external wireless equipment to identify a location of the external wireless equipment relative to device 10. Device 10 may identify the relative location of the external wireless equipment by identifying a range to the external wireless equipment (e.g., the distance between the external wireless equipment and device 10) and the angle of arrival (AoA) of radio-frequency signals from the external wireless equipment (e.g., the angle at which radio-frequency signals are received by device 10 from the external wireless equipment).

Figure 4:
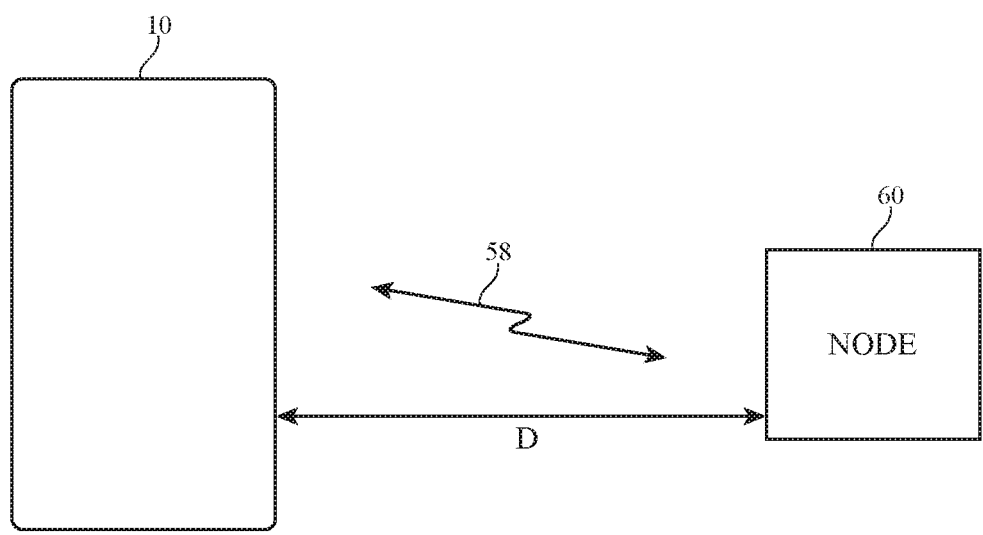
FIG. 4 is a diagram of an illustrative electronic device in wireless communication with an external node in a network in accordance with an embodiment.

FIG. 4 is a diagram showing how device 10 may determine a distance D between the device 10 and external wireless equipment such as wireless network node 60 (sometimes referred to herein as wireless equipment 60, wireless device 60, external device 60, or external equipment 60). Node 60 may include devices that are capable of receiving and/or transmitting radio-frequency signals such as signals 58. Node 60 may include tagged devices (e.g., any suitable object that has been provided with a wireless receiver and/or a wireless transmitter), electronic equipment (e.g., an infrastructure-related device), and/or other electronic devices (e.g., devices of the type described in connection with FIG. 1, including some or all of the same wireless communications capabilities as device 10).

For example, node 60 may be a laptop computer, a tablet computer, a somewhat smaller device such as a wrist-watch device, pendant device, headphone device, earpiece device, headset device (e.g., virtual or augmented reality headset devices), or other wearable or miniature device, a handheld device such as a cellular telephone, a media player, or other small portable device. Node 60 may also be a set-top box, a camera device with wireless communications capabilities, a desktop computer, a display into which a computer or other processing circuitry has been integrated, a display without an integrated computer, or other suitable electronic equipment. Node 60 may also be a key fob, a wallet, a book, a pen, or other object that has been provided with a low-power transmitter (e.g., an RFID transmitter or other transmitter). Node 60 may be electronic equipment such as a thermostat, a smoke detector, a Bluetooth® Low Energy (Bluetooth LE) beacon, a WiFi® wireless access point, a wireless base station, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

As shown in FIG. 4, device 10 may communicate with node 60 using wireless radio-frequency signals 58. Radio-frequency signals 58 may include Bluetooth® signals, near-field communications signals, wireless local area network signals such as IEEE 802.11 signals, millimeter wave communication signals such as signals at 60 GHz, ultra-wideband radio frequency signals, other radio-frequency wireless signals, infrared signals, etc. In one suitable arrangement that is described herein by example, radio-frequency signals 58 are ultra-wideband signals conveyed in ultra-wideband frequency bands such as 6.5 GHz and 8 GHz frequency bands. Radio-frequency signals 58 may be used to determine and/or convey information such as location and orientation information. For example, control circuitry 28 in device 10 may determine the location of node 60 relative to device 10 using radio-frequency signals 58.

In arrangements where node 60 is capable of sending or receiving communications signals, control circuitry 28 may determine distance D using wireless signals (e.g., radio-frequency signals 58 of FIG. 4). Control circuitry 28 may determine distance D using signal strength measurement schemes (e.g., measuring the signal strength of radio-frequency signals from node 60) or using time-based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 28 may use information from Global Positioning System receiver circuitry 42 (FIG. 2), proximity sensors (e.g., infrared proximity sensors or other proximity sensors), image data from a camera, motion sensor data from motion sensors, and/or using other circuitry in device 10 to help determine distance D. In addition to determining the distance D between device 10 and node 60, control circuitry 28 may determine the orientation of device 10 relative to node 60.

Figure 5:
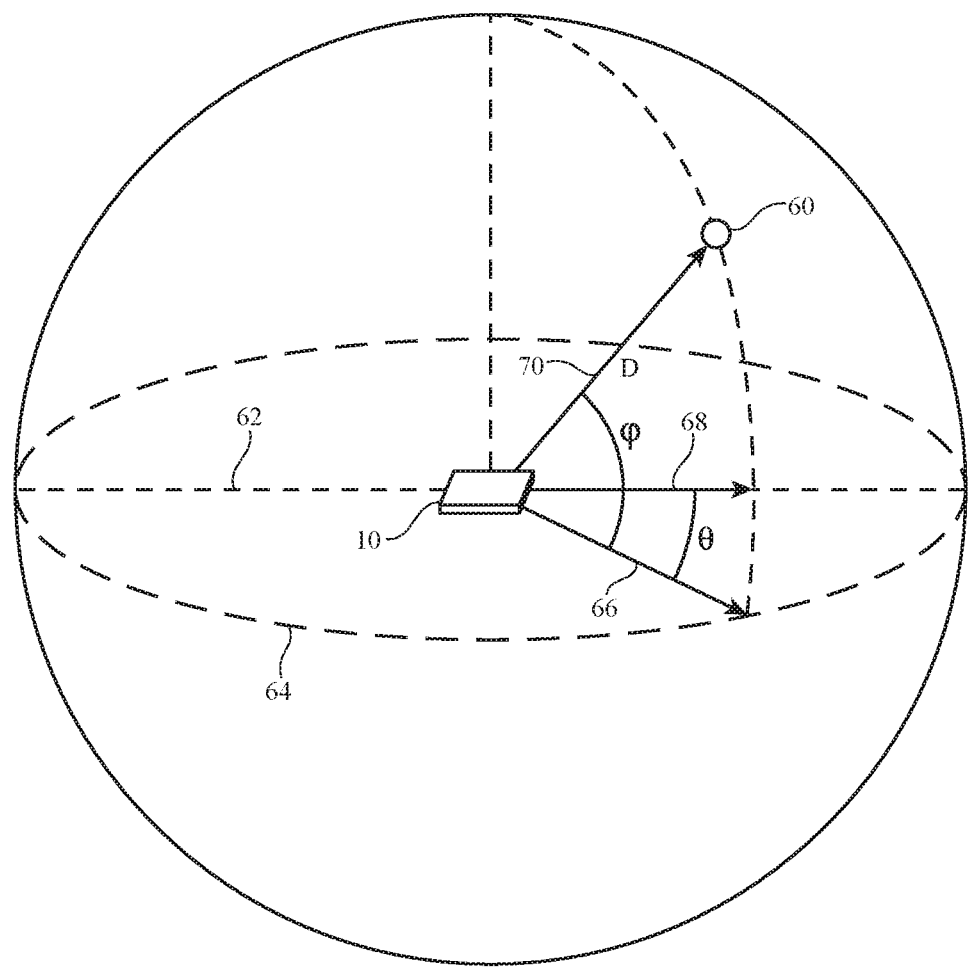
FIG. 5 is a diagram showing how the location (e.g., range and angle of arrival) of an external node in a network may be determined relative to an electronic device in accordance with an embodiment.

FIG. 5 illustrates how the position and orientation of device 10 relative to nearby nodes such as node 60 may be determined. In the example of FIG. 5, control circuitry 28 uses a horizontal polar coordinate system to determine the location and orientation of device 10 relative to node 60. In this type of coordinate system, control circuitry 28 may determine an azimuth angle θ and/or an elevation angle (p to describe the position of nearby nodes 60 relative to device 10. Control circuitry 28 may define a reference plane such as local horizon 64 and a reference vector such as reference vector 68. Local horizon 64 may be a plane that intersects device 10 and that is defined relative to a surface of device 10 (e.g., the front or rear face of device 10). For example, local horizon 64 may be a plane that is parallel to or coplanar with display 14 of device 10 (FIG. 1). Reference vector 68 (sometimes referred to as the "north" direction) may be a vector in local horizon 64. If desired, reference vector 68 may be aligned with longitudinal axis 62 of device 10 (e.g., an axis running lengthwise down the center of device 10 and parallel to the longest rectangular dimension of device 10, parallel to the Y-axis of FIG. 1). When reference vector 68 is aligned with longitudinal axis 62 of device 10, reference vector 68 may correspond to the direction in which device 10 is being pointed.

Azimuth angle θ and elevation angle φ may be measured relative to local horizon 64 and reference vector 68. As shown in FIG. 5, the elevation angle φ (sometimes referred to as altitude) of node 60 is the angle between node 60 and local horizon 64 of device 10 (e.g., the angle between vector 70 extending between device 10 and node 60 and a coplanar vector 66 extending between device 10 and horizon 64). The azimuth angle θ of node 60 is the angle of node 60 around local horizon 64 (e.g., the angle between reference vector 68 and vector 66). In the example of FIG. 5, the azimuth angle θ and elevation angle φ of node 60 are greater than 0°.

If desired, other axes besides longitudinal axis 62 may be used to define reference vector 68. For example, control circuitry 28 may use a horizontal axis that is perpendicular to longitudinal axis 62 as reference vector 68. This may be useful in determining when nodes 60 are located next to a side portion of device 10 (e.g., when device 10 is oriented side-to-side with one of nodes 60).

After determining the orientation of device 10 relative to node 60, control circuitry 28 may take suitable action. For example, control circuitry 28 may send information to node 60, may request and/or receive information from 60, may use display 14 (FIG. 1) to display a visual indication of wireless pairing with node 60, may use speakers to generate an audio indication of wireless pairing with node 60, may use a vibrator, a haptic actuator, or other mechanical element to generate haptic output indicating wireless pairing with node 60, may use display 14 to display a visual indication of the location of node 60 relative to device 10, may use speakers to generate an audio indication of the location of node 60, may use a vibrator, a haptic actuator, or other mechanical element to generate haptic output indicating the location of node 60, and/or may take other suitable action.

In one suitable arrangement, device 10 may determine the distance between the device 10 and node 60 and the orientation of device 10 relative to node 60 using two or more ultra-wideband antennas. The ultra-wide band antennas may receive wireless communication signals from node 60. Time stamps in the wireless communication signals may be analyzed to determine the time of flight of the wireless communication signals and thereby determine the distance (range) between device 10 and node 60. Additionally, angle of arrival (AoA) measurement techniques may be used to determine the orientation of electronic device 10 relative to node 60 (e.g., azimuth angle θ and elevation angle φ).

In angle of arrival measurement, node 60 transmits a radio-frequency signal to device 10 (e.g., radio-frequency signals 58 of FIG. 4). Device 10 may measure a delay in arrival time of the radio-frequency signal between the two or more ultra-wideband antennas. The delay in arrival time (e.g., the difference in received phase at each ultra-wideband antenna) can be used to determine the angle of arrival of the radio-frequency signal (and therefore the angle of node 60 relative to device 10). Once distance D and the angle of arrival have been determined, device 10 may have knowledge of the precise location of node 60 relative to device 10.

Figure 6:
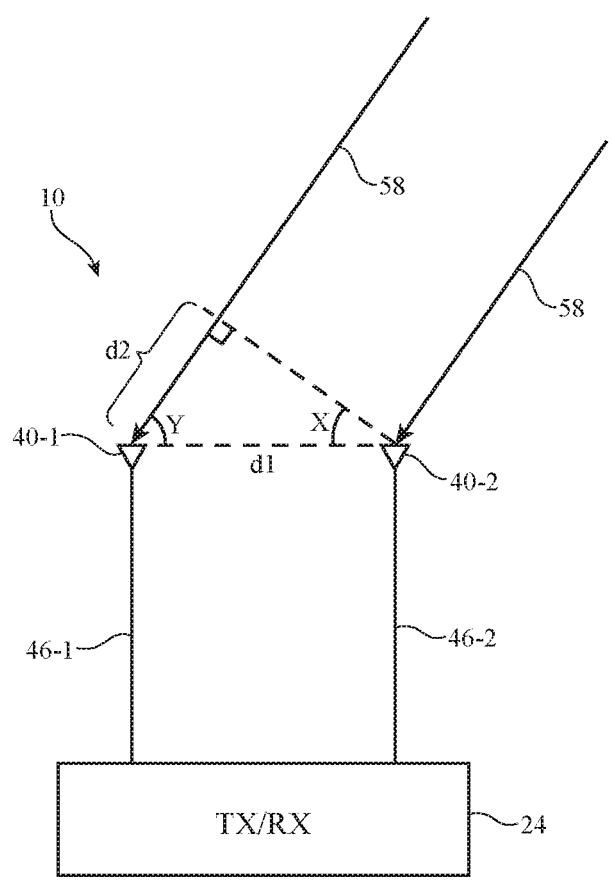
FIG. 6 is a diagram showing how illustrative antennas in an electronic device may be used for detecting angle of arrival in accordance with an embodiment.

FIG. 6 is a schematic diagram showing how angle of arrival measurement techniques may be used to determine the orientation of device 10 relative to node 60. As shown in FIG. 6, device 10 may include multiple antennas (e.g., a first antenna 40-1 and a second antenna 40-2) coupled to transceiver circuitry 24 over respective transmission lines 46 (e.g., a first transmission line 46-1 and a second transmission line 46-2).

Antennas 40-1 and 40-2 may each receive radio-frequency signals 58 from node 60 (FIG. 5). Antennas 40-1 and 40-2 may be laterally separated by a distance $d_1$, where antenna 40-1 is farther away from node 60 than antenna 40-2 (in the example of FIG. 6). Therefore, radio-frequency signals 58 travel a greater distance to reach antenna 40-1 than antenna 40-2. The additional distance between node 60 and antenna 40-1 is shown in FIG. 6 as distance $d_2$. FIG. 6 also shows angles x and y (where x+y=90°).

Distance $d_2$ may be determined as a function of angle y or angle x (e.g., $d_2=d_1*\sin(x)$ or $d_2=d_1*\cos(y)$). Distance $d_2$ may also be determined as a function of the phase difference between the signal received by antenna 40-1 and the signal received by antenna 40-2 (e.g., $d_2=(PD)*\lambda/(2*\pi)$), where PD is the phase difference (sometimes written "Δφ") between the signal received by antenna 40-1 and the signal received by antenna 40-2, and λ is the wavelength of radio-frequency signals 58. Device 10 may include phase measurement circuitry coupled to each antenna to measure the phase of the received signals and to identify phase difference PD (e.g., by subtracting the phase measured for one antenna from the phase measured for the other antenna). The two equations for $d_2$ may be set equal to each other (e.g., $d_1*\sin(x)=(PD)*\lambda/(2*\pi)$) and rearranged to solve for the angle x (e.g., $x=\sin^{-1}((PD)*\lambda/(2*\pi*d_1))$) or the angle y. Therefore, the angle of arrival may be determined (e.g., by control circuitry 28) based on the known (predetermined) distance between antennas 40-1 and 40-2, the detected (measured) phase difference PD between the signal received by antenna 40-1 and the signal received by antenna 40-2, and the known wavelength (frequency) of the received signals 58.

Distance $d_1$ may be selected to ease the calculation for phase difference PD between the signal received by antenna 40-1 and the signal received by antenna 40-2. For example, $d_1$ may be less than or equal to one half of the wavelength (e.g., effective wavelength) of the received signal 58 (e.g., to avoid multiple phase difference solutions).

With two antennas for determining angle of arrival (as in FIG. 6), the angle of arrival within a single plane may be determined. For example, antennas 40-1 and 40-2 in FIG. 6 may be used to determine azimuth angle θ. A third antenna may be included to enable angle of arrival determination in multiple planes (e.g., azimuth angle θ and elevation angle φ may both be determined). Angles x and/or y of FIG. 6 may be converted to spherical coordinates to obtain azimuth angle θ and elevation angle φ, for example.

Any desired antenna structures may be used for implementing antennas 40 that are used to compute angle of arrival. In one suitable arrangement that is sometimes described herein as an example, patch antenna structures may be used for implementing antennas 40. Antennas 40 that are implemented using patch antenna structures may sometimes be referred to herein as patch antennas. An illustrative patch antenna is shown in FIG. 7.

Figure 7:
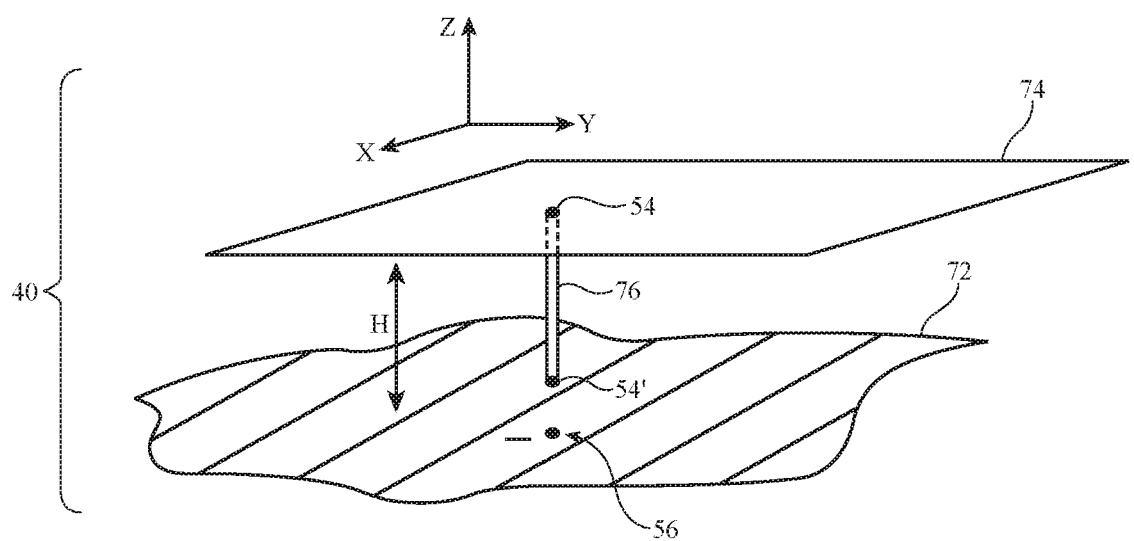
FIG. 7 is a diagram of an illustrative patch antenna in accordance with an embodiment.

As shown in FIG. 7, antenna 40 may have a patch antenna resonating element such as patch element 74 that is separated from a ground plane structure such as ground 72 (sometimes referred to as ground layer 72, grounding layer 72, or antenna ground 72). Patch element 74 and antenna ground 72 may be formed from metal foil, machined metal structures, metal traces on a printed circuit or a molded plastic carrier, electronic device housing structures, or other conductive structures in an electronic device such as device 10. Patch element 74 may sometimes be referred to herein as patch 74, patch antenna resonating element 74, patch radiating element 74, or antenna resonating element 74.

Patch element 74 may lie within a plane such as the X-Y plane of FIG. 7. Antenna ground 72 may lie within a plane that is parallel to the plane of patch element 74. Patch element 74 and antenna ground 72 may therefore lie in separate parallel planes that are separated by a distance H. In general, greater distances (heights) H may allow antenna 40 to exhibit a greater bandwidth than shorter distances H. However, greater distances H may consume more volume within device 10 (where space is often at a premium) than shorter distances H.

Conductive path 76 may be used to couple terminal 54' to positive antenna feed terminal 54. Antenna 40 may be fed using a transmission line with a signal conductor coupled to terminal 54' (and thus to positive antenna feed terminal 54) and with a ground conductor coupled to ground antenna feed terminal 56. Other feeding arrangements may be used if desired. If desired, patch element 74 and antenna ground 72 may have different shapes and orientations (e.g., planar shapes, curved patch shapes, patch element shapes with non-rectangular outlines, shapes with straight edges such as squares, shapes with curved edges such as ovals and circles, shapes with combinations of curved and straight edges, etc.).

Figure 8:
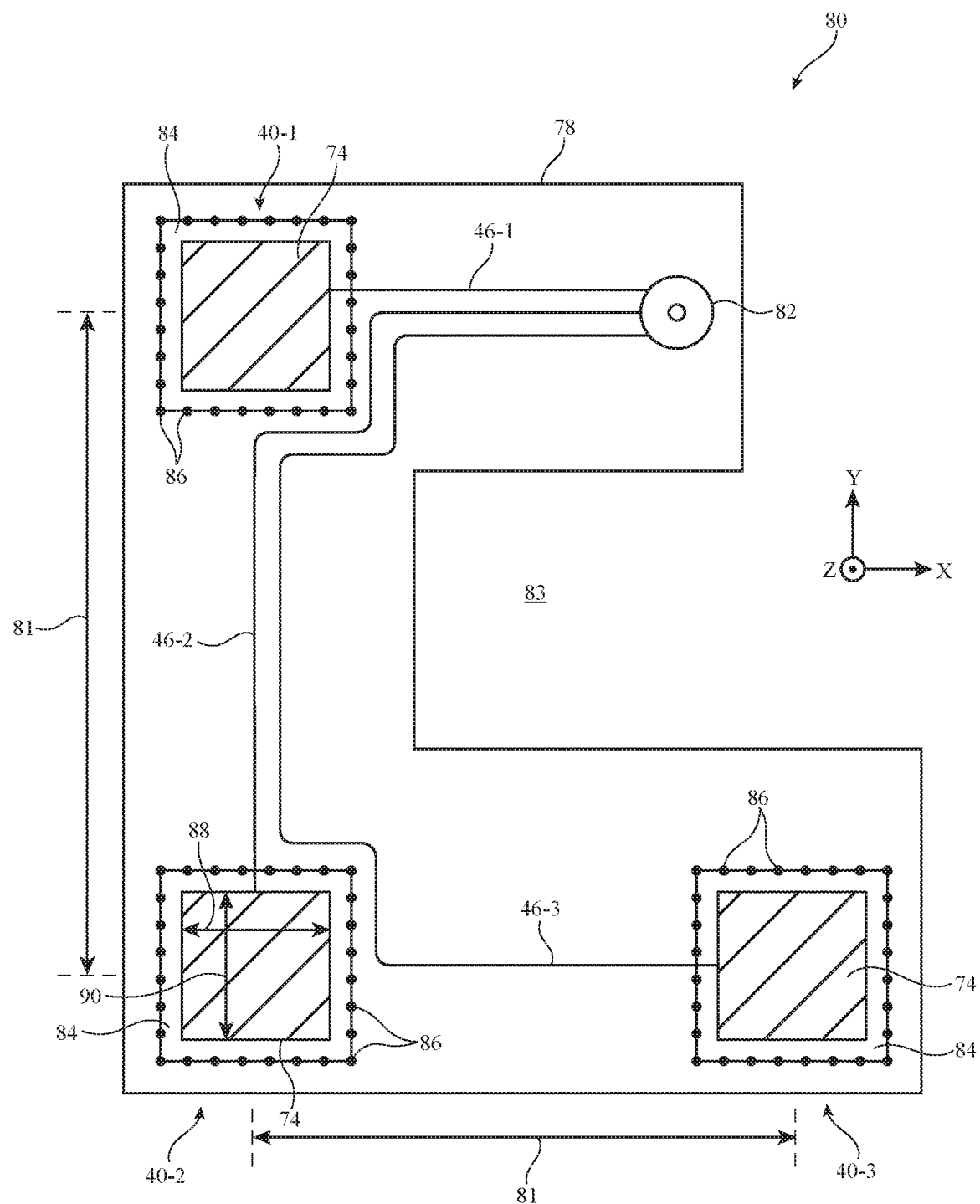
FIG. 8 is a top view of an illustrative ultra-wide band antenna module having three patch antennas for computing the angle of arrival of incoming radio-frequency signals in accordance with an embodiment.

Multiple antennas of the type shown in FIG. 7 may be used by control circuitry 28 to determine angle of arrival and thus the location of node 60 (FIG. 5) relative to device 10. FIG. 8 is a top-down view showing how three antennas 40 may be used to determine angle of arrival.

As shown in FIG. 8, device 10 may include an antenna module 80 for determining the angle of arrival of radio-frequency signals 58 received from node 60 (FIG. 4) and the range between device 10 and node 60. Antenna module 80 may include three or more antennas 40 such as a first antenna 40-1, a second antenna 40-2, and a third antenna 40-3. Antennas 40 may be configured to radiate at ultra-wideband frequencies and antenna module 80 may therefore sometimes be referred to herein as ultra-wideband antenna module 80.

Antennas 40-1, 40-2, and 40-3 may be mounted to a substrate such as substrate 78. Substrate 78 may be, for example, a rigid printed circuit board or a flexible printed circuit. Antennas 40-1 and 40-3 may be located along perpendicular axes about antenna 40-2 (e.g., antennas 40-1 and 40-2 may be aligned with an axis parallel to the Y-axis whereas antennas 40-2 and 40-3 are aligned with an axis parallel to the X axis of FIG. 8). While two antennas 40 may enable control circuitry 28 to determine angle of arrival within a single plane (e.g., azimuth angle θ or elevation angle φ of FIG. 5), using three antennas arranged along orthogonal axes such as antennas 40-1, 40-2, and 40-3 of FIG. 8 may enable control circuitry 28 to determine angle of arrival within multiple planes and thus in spherical coordinates (e.g., azimuth angle θ and elevation angle φ may both be determined).

Antenna 40-1 and antenna 40-3 may each be located at distance 81 from antenna 40-2. Distance 81 may be, for example, approximately equal to one half of the wavelength of operation of antennas 40-1, 40-2, and 40-3. Distance 81 may serve as distance $d_1$ (FIG. 6) between antennas 40-1 and 40-2 for computing angle of arrival within a single plane between antennas 40-1 and 40-2. Similarly, distance 81 may serve as distance $d_1$ between antennas 40-2 and 40-3 for computing angle of arrival within a single plane between antennas 40-2 and 40-3. If desired, substrate 78 may include a cut-out region 83 to accommodate other device components when antenna module 80 is mounted within device 10.

As shown in FIG. 8, each of antennas 40-1, 40-2, and 40-3 may include a respective patch element 74 mounted to a corresponding patch substrate 84. Patch substrates 84 (sometimes referred to herein as dielectric substrates 84 or dielectric carriers 84) may be mounted to the surface of substrate 78 and may separate patch elements 74 from the surface of substrate 78 (e.g., patch substrates 84 may extend along the Z-axis above the lateral surface of substrate 78). Patch substrates 84 may include plastic, ceramic, polyimide, liquid crystal polymer, or any other desired dielectric materials. Patch elements 74 may be formed from conductive traces on the surface of patch substrates 84. Patch substrates 84 may separate patch elements 74 from ground traces over, on, or within substrate 78 (e.g., antenna ground 72 of FIG. 7). This may serve to maximize the bandwidth of antennas 40-1, 40-2, and 40-3 (e.g., given the relatively thin profile of substrate 78).

If desired, each substrate 84 may include a respective set or fence of conductive vias 86 that extends through the patch substrate (e.g., parallel to the Z-axis of FIG. 8) and laterally around the corresponding patch element 74. For example, antenna 40-1 may include a fence of conductive vias 86 that laterally extends around (surrounds) each side of the patch element 74 in antenna 40-1. Each via 86 in the fences of conductive vias may be separated from two adjacent vias 86 in that fence by one-fifteenth of a wavelength or less, as an example. This may allow the fences of vias 86 to appear as a solid conductive wall (e.g., an infinite impedance) for radio-frequency signals conveyed laterally by patch elements 74 (e.g., parallel to the X-Y plane of FIG. 8). In this way, respective fences of conductive vias 86 may form conductive cavities for each patch element 74 and may serve to isolate each of antennas 40-1, 40-2, and 40-3 from each other and from electromagnetic interference from other device components.

Radio-frequency transmission lines 46 may be integrated within substrate 78 for feeding antennas 40-1, 40-2, and 40-3. For example, a first radio-frequency transmission line 46-1 may be coupled to antenna 40-1, a second radio-frequency transmission line 46-2 may be coupled to antenna 40-2, and a third radio-frequency transmission line 46-3 may be coupled to antenna 40-3. Radio-frequency transmission lines 46-1, 46-2, and 46-3 may be formed from conductive signal traces and conductive ground traces on substrate 78, for example.

Radio-frequency transmission lines 46-1, 46-2, and 46-3 may each be coupled to UWB transceiver circuitry 26 (FIG. 2) through radio-frequency connector 82. Connector 82 may be a coaxial cable connector or any other desired radio-frequency connector. Transceiver circuitry 26 may be formed on a separate substrate such as a main logic board for device 10. Radio-frequency transmission line 46-2 may be routed from radio-frequency connector 82 to antenna 40-2 around antenna 40-1 and cut-out region 83. Similarly, radio-frequency transmission line 46-3 may be routed from radio-frequency connector 82 to antenna 40-3 around antennas 40-1 and 40-2 and cut-out region 83. The example of FIG. 8 is merely illustrative and, in general, substrate 78 may have any desired shape and radio-frequency transmission lines 46 may be provided with any desired routing arrangement.

Each of antennas 40-1, 40-2, and 40-3 may have the same dimensions for covering the same frequencies, for example. The dimensions of patch elements 74 may be selected to radiate within one or more desired frequency bands. For example, each patch element 74 may have a length 88 and an orthogonal width 90. Length 88 may be selected so that patch element 74 radiates in a first frequency band (e.g., length 88 may be approximately one-half of the wavelength corresponding to a frequency in a 6.5 GHz frequency band) and width 90 may be selected so that patch element 74 radiates in a second frequency band (e.g., length 90 may be approximately one-half of the wavelength corresponding to a frequency in the 8 GHz frequency band). Positive antenna feed terminals 54 (FIG. 7) may be coupled to patch elements 74 at a location that is offset at a selected distance from the center of patch elements 74 to match the impedance of patch elements 74 to the corresponding radio-frequency transmission line 46 in these frequency bands.

The example of FIG. 8 is merely illustrative and, if desired, patch elements 74 may have other shapes (e.g., shapes having curved and/or straight edges). If desired, other device components such as matching circuitry, radio-frequency front end circuitry, filter circuitry, switching circuitry, amplifier circuitry, phase shifter circuitry, phase measurement circuitry, a camera module, a speaker, a light emitter, an ambient light sensor, another antenna for covering wireless local area network communications or other non-ultra-wideband communications, a vibrator, display components, proximity sensor components, or any other desired device components may be mounted to antenna module 80 (e.g., on substrate 78).

Figure 9:
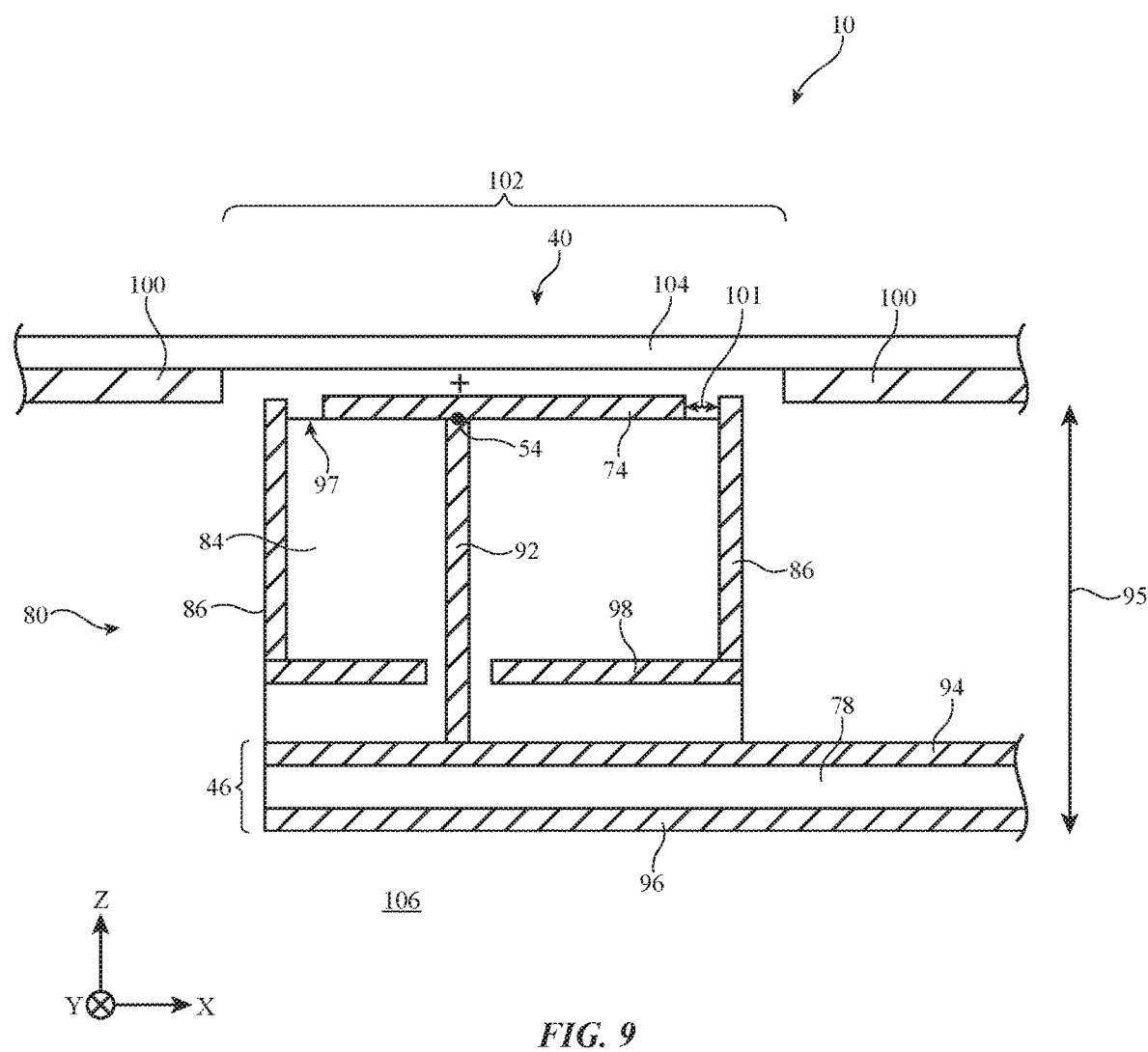
FIG. 9 is a cross-sectional side view of an illustrative ultra-wide band antenna module mounted within an electronic device in accordance with an embodiment.

FIG. 9 is a cross-sectional side view showing how antenna module 80 may be mounted within device 10. As shown in FIG. 9, antenna module 80 may be mounted within device 10 adjacent to a dielectric cover layer such as dielectric cover layer 104. Dielectric cover layer 104 may form a dielectric rear wall for device 10 (e.g., dielectric cover layer 104 of FIG. 9 may form part of rear housing wall 12R of FIG. 1) or may form a display cover layer for device 10 (e.g., dielectric cover layer 104 of FIG. 9 may be a display cover layer for display 14 of FIG. 1), as examples. Dielectric cover layer 104 may be formed from a visually opaque material or may be provided with pigment so that dielectric cover layer 104 is visually opaque if desired.

A conductive layer such as conductive layer 100 may be coupled to an interior surface of dielectric cover layer 100. Conductive layer 100 may form a part of rear housing wall 12R of FIG. 1 or may be formed from other device housing structures such as a conductive support plate for device 10, as examples. Conductive layer 100 may include an aperture (opening) 102. Antenna module 80 may be mounted within interior 106 of device 10 so that antenna 40 (e.g., one of antennas 40-1, 40-2, or 40-3 of FIG. 8) is aligned with aperture 102. When mounted in this way, antenna 40 may receive radio-frequency signals 58 (FIG. 4) through dielectric cover layer 104 and aperture 102. Patch element 74 of antenna 40 may be pressed against dielectric cover layer 104, may be coupled to dielectric cover layer 104 using a layer of adhesive, or may be spaced apart from dielectric cover layer 104.

As shown in FIG. 9, antenna module 80 may include patch substrate 84 mounted to substrate 78. Patch substrate 84 may be rigid whereas substrate 78 is flexible, in one example. In this scenario, the portion of substrate 78 under patch substrate 84 may be rigid whereas the portion of substrate 78 extending beyond patch substrate 84 is flexible (e.g., a flexible printed circuit tail). Patch substrate 84 may be coupled to substrate 78 using adhesive if desired.

Patch substrate 84 and/or substrate 78 may each include multiple stacked dielectric layers (e.g., multiple layers of printed circuit board substrate such as multiple layers of fiberglass-filled epoxy) or may each include a single dielectric layer. Patch substrate 84 may include any desired dielectric materials such as epoxy, plastic, ceramic, glass, foam, polyimide, liquid crystal polymer, or other materials. Flexible substrate 78 may include conductive traces 94 and conductive traces 96 (e.g., conductive traces formed on different dielectric layers of substrate 78). Conductive traces 94 and 96 may collectively form radio-frequency transmission line 46 for antenna 40. Conductive traces 94 may form the signal conductor (e.g., signal conductor 48 of FIG. 3) whereas conductive traces 96 form the ground conductor (e.g., ground conductor 50 of FIG. 3) for antenna 40, for example.

Ground traces 98 may be embedded within patch substrate 84 and may be held at a ground potential (e.g., ground traces 98 may be coupled to other ground structures in device 10 such as conductive traces 96). Patch element 74 may be formed from conductive traces on surface 97 of patch substrate 84. In scenarios where patch substrate 84 is formed from multiple stacked dielectric layers, ground traces 98 may be formed from conductive traces on a first dielectric layer in patch substrate 84 whereas patch element 74 is formed from conductive traces on another dielectric layer in patch substrate 84. Conductive traces 94 (e.g., the signal conductor for radio-frequency transmission line 46) may be coupled to positive antenna feed terminal 54 on patch element 74 by conductive feed via 92 extending through patch substrate 84 and an opening in ground traces 98.

Conductive vias 86 may extend through patch substrate 84 from ground traces 98 to surface 97. Conductive vias 86 may be coupled to conductive landing pads on surface 97 of patch substrate 84 (e.g., conductive contact pads that are co-planar with patch element 74). Conductive vias 86 may be separated from patch element 74 by distance 101 at surface 97 (e.g., the conductive landing pads may be laterally separated from patch element 74 by distance 101).

Distance 101 may be large enough to allow for some tolerance in manufacturing antenna 40 while also being small enough to minimize the footprint of antenna 40 within device 10. As an example, distance 101 may be between 0.4 mm and 0.6 mm (e.g., 0.5 mm). Conductive vias 86 may be formed at the peripheral edges of patch substrate 84 (e.g., may surround a periphery of patch substrate 84) or patch substrate 84 may laterally extend beyond conductive vias 86. Conductive vias 86 may prevent radio-frequency signals handled by patch element 74 from laterally escaping into interior 106 of device 10 and may prevent electromagnetic signals within interior 106 from interfering with antenna 40.

When configured in this way, antenna module 80 may exhibit a thickness 95 (e.g., parallel to the Z-axis of FIG. 9). Thickness 95 may be between 0.2 and 0.4 mm, as an example. This relatively narrow profile may allow antenna module 80 to be mounted within relatively narrow spaces within device 10 and in close proximity to other device components. Conductive vias 86 may serve to electromagnetically isolate antennas 40 from other device components despite their close proximity to antenna 40.

In practice, antennas 40-1, 40-2, and 40-3 may be susceptible to impedance loading from external objects (e.g., objects at or adjacent to the exterior surface of dielectric cover 104) such as a user's hand, clothing, or other parts of the user's body, a removable protective case for device 10, a dielectric film, or other objects. Loading from external objects can affect the phase of the radio-frequency signals received by antennas 40-1, 40-2, and 40-3. For example, control circuitry 28 (FIG. 2) may measure a particular phase when a given antenna is in a free space environment and may measure a different phase when that antenna is covered by a user's finger, even though the phases were measured from a signal received by device 10 at the same angle of arrival.

These discrepancies in measured signal phase can cause control circuitry 28 to generate erroneous phase difference values PD between pairs of antennas. Because phase difference values PD are used to determine the angle of arrival, these errors in phase difference values PD can cause control circuitry 28 to generate erroneous angle of arrival data (e.g., control circuitry 28 may erroneously determine that node 60 of FIG. 5 is located at an inaccurate angle with respect to device 10). It would therefore be desirable to be able to provide antenna module 80 with the ability to generate accurate angle of arrival information regardless of how the antennas are being loaded by external objects.

Figure 10:
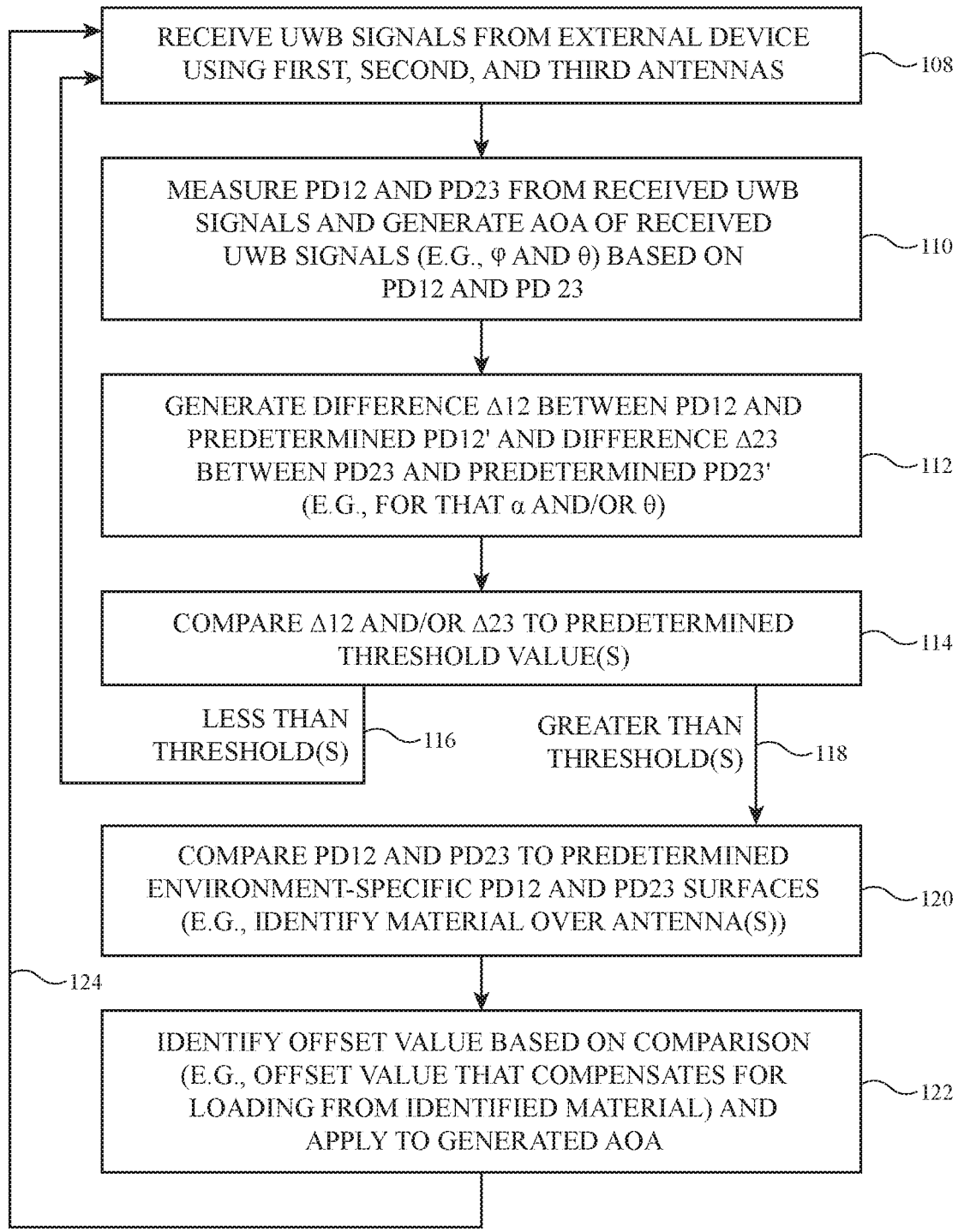
FIG. 10 is a flow chart of illustrative steps involved in operating an ultra-wide band antenna module to compute angle of arrival regardless of environmental loading conditions in accordance with an embodiment.

FIG. 10 is a flow chart of illustrative steps that may be performed by device 10 to generate accurate angle of arrival information regardless of the environmental loading conditions for antennas 40-1, 40-2, and 40-3. The steps of FIG. 10 may, for example, be performed by control circuitry 28 of FIG. 2 and antenna module 80 of FIGS. 8 and 9.

At step 108, antennas 40-1, 40-2, and 40-3 may receive radio-frequency signals 58 from node 60 (FIG. 4). In one suitable arrangement described herein by example, the radio-frequency signals are ultra-wideband signals in one or more ultra-wideband frequency bands (e.g., a 6.5 GHz ultra-wideband frequency band and an 8 GHz ultra-wideband frequency band).

At step 110, phase measurement circuitry on antenna module 80 may measure the phase of the ultra-wideband signals received by each of antennas 40-1, 40-2, and 40-3 and may pass the measured phases to control circuitry 28. For example, the phase measurement circuitry may generate a first phase measurement for antenna 40-1, a second phase measurement for antenna 40-2, and a third phase measurement for antenna 40-3.

Control circuitry 28 may subtract the second phase measurement from the first phase measurement to generate a first phase difference value PD12 (sometimes annotated "$\Delta\phi_{12}$") between antennas 40-1 and 40-2 (sometimes referred to herein as phase difference PD12). Similarly, control circuitry 28 may subtract the third phase measurement from the second phase measurement to generate a second phase difference value PD23 (sometimes annotated "$\Delta\phi_{23}$") between antennas 40-2 and 40-3 (sometimes referred to herein as phase difference PD23). Control circuitry 28 may determine the three-dimensional angle of arrival for the received ultra-wideband signals (e.g., azimuth angle $\theta$ and elevation angle $\varphi$) based on phase difference values PD12 and PD23. If desired, control circuitry 28 may also determine the range between device 10 and node 60 using the received ultra-wideband signals (e.g., range D of FIGS. 4 and 5).

At step 112, control circuitry 28 may generate a first difference value $\Delta 12$ by subtracting phase difference value PD12 from a predetermined phase difference value PD12' and may generate a second difference value $\Delta 23$ by subtracting phase difference value PD23 from a predetermined phase difference value PD23'. Predetermined phase difference values PD23' and PD12' may be stored at control circuitry 28 (e.g., in non-volatile memory). Predetermined difference value PD12' may be a free-space phase difference value that is generated between antennas 40-1 and 40-2 in a free-space environment (e.g., an operating environment in which antennas 40-1 and 40-2 are not loaded by any external objects). Similarly, predetermined difference value PD23' may be a free-space phase difference value that is generated between antennas 40-2 and 40-3 in a free-space environment (e.g., an operating environment in which antennas 40-2 and 40-3 are not loaded by any external objects). Predetermined phase difference values PD12' and PD23' may, for example, be generated during calibration of wireless circuitry 34 (e.g., prior to assembling device 10 or prior to normal operation of device 10 by an end user).

At step 114, control circuitry 28 may compare difference value $\Delta 12$ and/or difference value $\Delta 23$ to one or more predetermined threshold values to determine whether one of antennas 40-1, 40-2, and 40-3 is not in a free-space environment (e.g., to determine whether one of antennas 40-1, 40-2, and 40-3 is being loaded by an external object). For example, control circuitry 28 may compare each difference value to different respective threshold values, may compare each difference value to the same threshold value, or may compare a combination of the difference values to a threshold value.

If each difference value is less than corresponding threshold value(s), this may be indicative of antennas 40-1, 40-2, and 40-3 being operated in a free-space environment and processing may loop back to step 108 as shown by path 116. Control circuitry 28 may identify that the angle of arrival information generated during the preceding iteration of step 110 is accurate and may proceed to identify the location of node 60 relative to device 10 or perform any other desired operations based on the angle of arrival information.

If one or more difference value is greater than the threshold value(s), this may be indicative of antennas 40-1, 40-2, and/or 40-3 being operated in a non-free-space environment in which one or more of antennas 40-1, 40-2, and 40-3 is being loaded or blocked by an external object. Processing may subsequently proceed to step 120 as shown by path 118.

At step 120, control circuitry 28 may compare phase difference value PD12 to a set of predetermined environment-specific PD12 surfaces and/or may compare phase difference value PD23 to a set of predetermined environment-specific PD23 surfaces. The predetermined environment-specific PD12 and PD23 surfaces may be stored at control circuitry 28.

The predetermined environment-specific PD12 surfaces may include surfaces of phase difference values PD12 generated using antennas 40-1 and 40-2 under different environmental loading conditions (e.g., as generated during calibration of device 10). Each surface may include expected PD12 values over all possible measured angles of arrival under a corresponding environmental loading condition. For example, control circuitry 28 may store a first surface of expected PD12 values for scenarios where device 10 has been placed within a removable protective case, a second surface of expected PD12 values for scenarios where antenna 40-1 is being covered by a user's finger, a third surface of expected PD12 values for scenarios where antenna 40-2 is being covered by a user's hand, etc.

Similarly, the predetermined environment-specific PD23 surfaces may include surfaces of phase difference values PD23 generated using antennas 40-2 and 40-3 under different environmental loading conditions (e.g., as generated during calibration of device 10). Each surface may include expected PD23 values over all possible measured angles of arrival under a corresponding environmental loading condition. For example, control circuitry 28 may store a first surface of expected PD23 values for scenarios where device 10 has been placed within a removable protective case, a second surface of expected PD23 values for scenarios where antenna 40-2 is being covered by a user's finger while placed in a protective case, a third surface of expected PD23 values for scenarios where antennas 40-2 and 40-3 are being covered by a user's hand without a protective case, etc. This example in which control circuitry 28 compares the phase difference values to three-dimensional surfaces of phase difference values is merely illustrative and, if desired, control circuitry 28 may compare the phase difference values to two-dimensional curves of phase difference values (e.g., curves lying on a surface given a fixed azimuthal or elevation angle).

Control circuitry 28 may select a predetermined environment-specific PD12 surface (curve) that matches the measured phase difference value PD12 and may select a predetermined environment-specific PD23 surface (curve) that matches the measured phase difference value PD23. Control circuitry 28 may identify the environmental loading condition associated with matching predetermined PD12 and PD23 surfaces. For example, if the measured PD12 value matches a predetermined PD12 surface corresponding to antenna 40-1 being loaded by a user's finger and the measured PD23 value matches a predetermined PD23 surface associated with no objects loading antennas 40-2 and 40-3, control circuitry 28 may determine that antenna 40-1 is being blocked by a user's finger. As another example, if the measured PD12 value matches a predetermined PD12 surface corresponding to antennas 40-2 and 40-1 being loaded by a removable dielectric case for device 10 and the measured PD23 value matches a predetermined PD23 surface corresponding to antennas 40-2 and 40-3 being loaded by a removable dielectric case for device 10, control circuitry 28 may determine that device 10 is mounted within a removable dielectric case (e.g., that antennas 40-1, 40-2, and 40-3 are being loaded by a removable dielectric case for device 10). Control circuitry 28 may include any desired number of predetermined environment-specific PD12 and PD23 surfaces associated with any desired loading of any desired combination of antennas 40-1, 40-2, and 40-3 by any desired external objects.

At step 122, control circuitry 28 may identify predetermined angle of arrival offset values based on the identified environmental loading conditions (e.g., based on the comparison performed while processing step 120). The offset values may be stored at control circuitry 28 and may be generated during calibration of device 10. Because different environmental loading conditions may generate different deviations in the phases measured by antennas 40-1, 40-2, and 40-3, these deviations can be measured and characterized during calibration of device 10. The predetermined offset values stored at control circuitry 28 may compensate for these pre-characterized effects. For example, control circuitry 28 may store a first set of offset values associated with antennas 40-1, 40-2, and 40-3 being loaded by a dielectric case for device 10, a second set of offset values associated with antenna 40-1 being blocked by a user's finger, a third offset value associated with antenna 40-3 being blocked by a user's finger, etc.

Control circuitry 28 may add or otherwise combine the identified offset values with the determined angle of arrival (e.g., as generated while processing step 110) to generate a corrected angle of arrival value (e.g., a corrected azimuth angle θ and a corrected elevation angle φ). The offset values may compensate for errors in the angle of arrival value generated on account of shifts in phase values measured by antennas 40-1, 40-2, and/or 40-3 due to the presence of different external objects.

Consider one example in which a user's finger is placed over antenna 40-1. The user's finger may shift the phase of the ultra-wideband signal received by antenna 40-1 away from the phase that the antenna would exhibit if the finger was not present. The magnitude of this shift is dependent upon the material that is placed over the antenna (e.g., the environmental loading conditions for the antenna). This shift also results in a shift in the measured phase difference value PD12 away from the phase difference value that the antennas would exhibit if the finger were not present. The shifted phase difference value would be characteristic of node 60 being located at a different location than its actual location. When control circuitry 28 generates an angle of arrival value based on the shifted phase difference value, the angle of arrival would be erroneous and characteristic of node 60 being located at a location other than its actual location. However, by comparing the measured phase difference values to the predetermined surfaces of phase difference values (e.g., by performing the steps of FIG. 10), control circuitry 28 may identify the environmental loading conditions for the antennas (e.g., information about which antennas are being covered by what type of material) based on phase differences measured between the antennas. The predetermined offset values may correspond to the particular environmental loading conditions that contributed to the measured phase differences. By adjusting the angle of arrival using the predetermined offset values, the erroneous angle of arrival may be corrected to reflect the accurate location of node 60.

Processing may subsequently loop back to step 108 as shown by path 124. In this way, control circuitry 28 may ensure that correct angle of arrival information is determined regardless of whether antennas 40-1, 40-2, and/or 40-3 are being loaded by external objects. Control circuitry 28 may subsequently use the corrected angle of arrival information to determine the accurate location of node 60 with respect to device 10 (FIG. 5).

Figure 11:
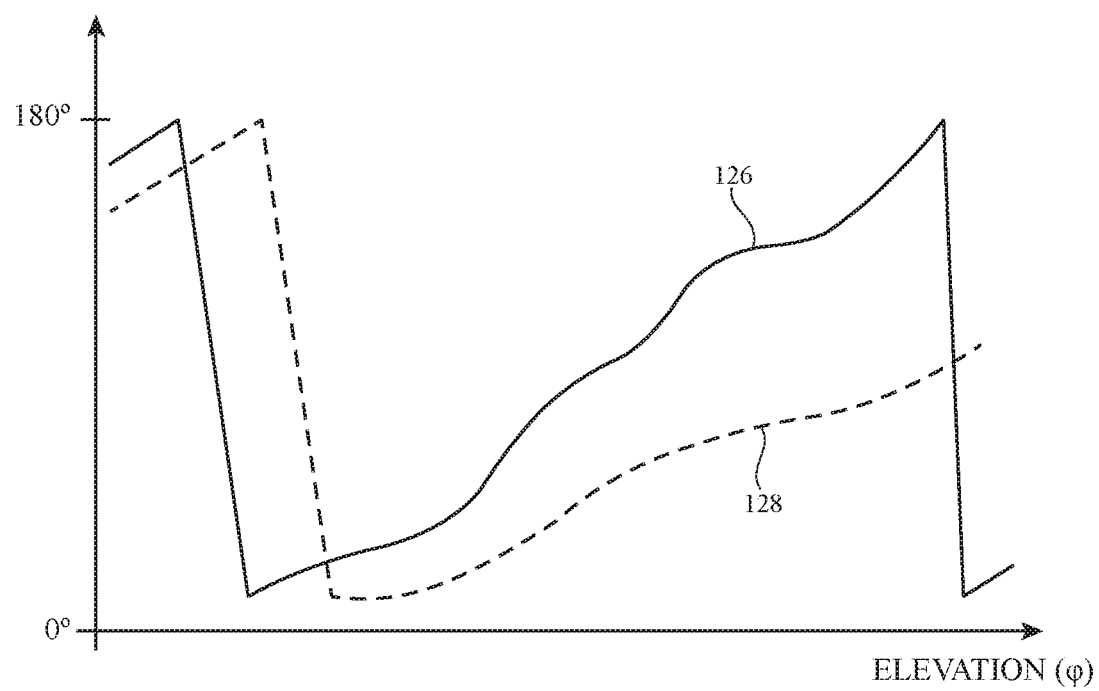
FIG. 11 is an illustrative plot of phase difference on arrival as a function of elevation angle for radio-frequency signals received by an antenna under different environmental loading conditions in accordance with an embodiment.

FIG. 11 is a plot of phase difference on arrival as a function of elevation for a given one of antennas 40-1, 40-2, and 40-3. As shown in FIG. 11, the Y-axis plots phase difference on arrival PD (e.g., phase difference value PD12 or phase difference value PD23) whereas the X-axis plots elevation angle φ of the incoming ultra-wideband signals (e.g., for a fixed azimuth angle θ).

Curve 126 illustrates the expected phase difference on arrival for a free-space environment in which a pair of the antennas is not loaded by an external object. Curve 128 illustrates the expected phase difference on arrival when the pair of antennas is covered by a finger. As shown by curves 126 and 128, the expected phase difference on arrival generally increases as the elevation angle of the received ultra-wideband signal increases. However, the manner in which the phase difference varies over elevation angle changes based on whether the antennas are being loaded by an external object. By performing the operations of FIG. 10, control circuitry 28 may compensate for these variations to ensure that angle of arrival information generated based on the measured phase difference is accurate.

Curves 126 and 128 may be predetermined phase difference curves that are stored at control circuitry 28. Curves 126 and 128 may be generated during calibration of device 10, for example. Curve 126 may represent a two-dimensional portion of predetermined three-dimensional free-space surface (e.g., for a fixed azimuth angle θ). Curve 128 may represent a two-dimensional portion of predetermined three-dimensional surface corresponding to an environment in which the pair of antennas is covered by a finger (e.g., for a fixed azimuth angle θ). Control circuitry 28 may, if desired, compare curve 126 to measured phase difference values while processing step 112 of FIG. 10. Control circuitry 28 may, if desired, compare curves 126 and 128 (or larger surfaces to which curves 126 and 128 belong) to measured phase difference values while processing step 120 of FIG. 12. If the measured phase difference values match curve 128, control circuitry 28 may determine that a finger is loading the pair of antennas and may identify offset values corresponding to situations in which a finger is loading the pair of antennas. Control circuitry 28 may add the offset values to the measured angle of arrival to generate a corrected angle of arrival (e.g., while processing step 122 of FIG. 10) that accurately reflects the location of node 60 (FIG. 5). The example of FIG. 11 is merely illustrative. Curves 126 and 128 may have other shapes.

The foregoing is merely illustrative and various modifications can be made by those skilled in the art without departing from the scope and spirit of the described embodiments. The foregoing embodiments may be implemented individually or in any combination.

What is claimed is:
1. Apparatus comprising:
a first substrate;
a second substrate mounted to the first substrate;
a patch antenna having an antenna resonating element formed from a conductive trace on the second substrate, wherein the patch antenna is configured to receive radio-frequency signals in an ultra-wideband communications band;
a ground trace in the second substrate;
a radio-frequency transmission line in the first substrate and having a signal conductor coupled to the conduc- tive trace by a conductive feed via that extends through the second substrate and through an opening in the ground trace; and a fence of conductive vias, wherein the fence of conductive vias is coupled to the ground trace, extends through the second substrate, and laterally surrounds the conductive feed via.

2. The apparatus defined in claim 1, wherein the conductive trace is formed on a surface of the second substrate and the fences of conductive vias extend from the ground trace to conductive pads on the surface of the substrate.

3. The apparatus defined in claim 2, wherein the conductive pads are laterally separated from the conductive trace at the surface of the second substrate by a distance, the distance being between 0.4 mm and 0.6 mm.

4. The apparatus defined in claim 1, wherein the first substrate comprises a flexible printed circuit and the second substrate comprises a material selected from the group consisting of: polyimide, liquid crystal polymer, and plastic.

5. The apparatus defined in claim 1, further comprising control circuitry configured to identify an angle of arrival of the radio-frequency signals received by the patch antenna.

6. The apparatus defined in claim 1 wherein the second substrate comprises ceramic.

7. The apparatus defined in claim 6 wherein the first substrate comprises a flexible printed circuit.

8. The apparatus defined in claim 1 further comprising:
a third substrate mounted to the first substrate;
an additional patch antenna having an additional antenna resonating element formed from an additional conductive trace on the third substrate, wherein the additional patch antenna is configured to receive the radio-frequency signals in the ultra-wideband communications band;
an additional ground trace in the third substrate; and
an additional radio-frequency transmission line in the first substrate and having an additional signal conductor coupled to the additional conductive trace by an additional conductive feed via that extends through the third substrate and through an additional opening in the additional ground trace.

9. The apparatus defined in claim 8 further comprising:
an additional fence of conductive vias, wherein the additional fence of conductive vias is coupled to the additional ground trace, extends through the third substrate, and laterally surrounds the additional conductive feed via.

10. The apparatus defined in claim 9, further comprising:
a radio-frequency connector mounted to the first substrate, wherein the radio-frequency transmission line and the additional radio-frequency transmission line are coupled to the radio-frequency connector.

11. The apparatus defined in claim 8, further comprising:
control circuitry configured to identify a phase difference between the patch antenna and the additional patch antenna based on the radio-frequency signals received by the patch antenna and the additional patch antenna, wherein the control circuitry is configured to determine an angle-of-arrival of the radio-frequency signals based on the identified phase difference.

12. The apparatus defined in claim 11, wherein the control circuitry is configured to identify an operating environment for the patch antenna and the additional patch antenna based on the identified phase difference, the control circuitry is configured to select an offset value from a set of predetermined offset values based on the identified operating environment, and the control circuitry is configured to adjust the angle of arrival value using the selected offset value.

13. The apparatus defined in claim 8, wherein the apparatus comprises an electronic device having opposing first and second faces and further comprises:
a display at the first face;
a dielectric layer at the second face; and
a conductive layer coupled to an interior surface of the dielectric layer, wherein the conductive layer comprises a first aperture that is aligned with the patch antenna and a second aperture that is aligned with the additional patch antenna.

14. The apparatus defined in claim 1, further comprising:
a third substrate mounted to the first substrate
a fourth substrate mounted to the first substrate;
a first additional antenna having a first additional antenna resonating element formed from a first additional conductive trace on the third substrate, wherein the first additional antenna is configured to receive the radio-frequency signals in the ultra-wideband communications band; and
a second additional antenna having a second additional antenna resonating element formed from a second additional conductive trace on the fourth substrate, wherein the second additional antenna is configured to receive the radio-frequency signals in the ultra-wideband communications band.

15. The apparatus defined in claim 14, further comprising:
a first additional ground trace in the third substrate;
a second additional ground trace in the fourth substrate;
a first additional radio-frequency transmission line in the first substrate and having a first additional signal conductor coupled to the first additional conductive trace by a first additional conductive feed via that extends through the third substrate and through a first additional opening in the first additional ground trace; and
a second additional radio-frequency transmission line in the first substrate and having a second additional signal conductor coupled to the second additional conductive trace by a second additional conductive feed via that extends through the fourth substrate and through a second additional opening in the second additional ground trace.

16. The apparatus defined in claim 15, further comprising:
a first additional fence of conductive vias, wherein the first additional fence of conductive vias is coupled to the first additional ground trace, extends through the third substrate, and laterally surrounds the first additional conductive feed via; and
a second additional fence of conductive vias, wherein the second additional fence of conductive vias is coupled to the second additional ground trace, extends through the fourth substrate, and laterally surrounds the second additional conductive feed via.

17. The apparatus defined in claim 14, further comprising control circuitry configured to:
identify a first phase difference between the patch antenna and the first additional antenna based on the radio-frequency signals received by the patch antenna and the first additional antenna;
identify a second phase difference between the first and second additional antennas based on the radio-frequency signals received by the first and second additional antennas; and
determine an angle of arrival value for the radio-frequency signals based on the first and second phase differences.

18. The apparatus defined in claim 17, wherein the apparatus comprises an electronic device with opposing first and second faces, the apparatus further comprising:
- a display at the first face;
- a dielectric layer at the second face; and
- a conductive layer coupled to an interior surface of the dielectric layer, wherein the conductive layer comprises a first aperture that is aligned with the patch antenna, a second aperture that is aligned with the first additional antenna, and a third aperture that is aligned with the second additional antenna.

19. The apparatus defined in claim 18, wherein the first substrate comprises a flexible printed circuit.

20. The apparatus defined in claim 14 wherein the patch antenna and the first additional antenna are aligned along a first axis and the first and second additional antennas are aligned along a second axis perpendicular to the first axis.

* * * * *